Aug. 21, 1956 W. C. LUEBKING 2,760,139
SHAFT POSITIONING APPARATUS
Filed April 20, 1955 4 Sheets-Sheet 1

INVENTOR.
WALTER C. LUEBKING
BY
Charles H. Brown
ATTORNEY

FIG.7

United States Patent Office 2,760,139
Patented Aug. 21, 1956

2,760,139

SHAFT POSITIONING APPARATUS

Walter Charles Luebking, Woodland Hills, Calif., assignor to Radio Corporation of America, a corporation of Delaware Application April 20, 1955, Serial No. 502,635

15 Claims. (Cl. 318—467)

This invention relates to shaft positioning apparatus and, more particularly, to improvements in apparatus especially designed for the automatic tuning of radio equipment.

The quality of radio equipment has steadily improved such that, in the present state of the art, the selectivity of the equipment must be increased to a point where it is difficult, if not impossible, to tune precisely by manual means. Great care must be exercised to avoid tuning the equipment through a desired station or condition of operation. Attempts to tune such equipment by manual means result in undesirable inaccuracies and in the unsatisfactory operation of the equipment.

Various mechanical and electro-mechanical apparatus have been devised for automatic tuning control. By using such automatic control means, considerably finer tuning is obtainable than would be possible by the usual manual means. In general, the apparatus involves the mechanical attachment of a drive shaft to the component or device to be tuned, for example, a variable condenser, slug-tuning rack, or a tunable coil. The drive shaft is, in turn, mechanically connected to a driving means so that it is driven in a particular direction by the driving means to tune the device to which it is connected. Considerable accuracy has been obtained by the use of such apparatus. However, the successful operation of such control devices has been hindered by the need in the apparatus for critical adjustments and the existence of severe tolerance requirements.

In the operation of radio equipment, it is often necessary or advisable that a number of stages or components of the equipment be tuned simultaneously. The simultaneous tuning insures a greater degree of accuracy and assists in the maintenance of the proper electrical relationship between the various stages or components. For example, in the operation of a radio receiver, it is desirable that the radio frequency, intermediate frequency, master oscillator and other stages be simultaneously tuned to an incoming frequency. The tuning of the receiver is greatly simplified and a considerably greater degree of accuracy is insured by the simultaneous tuning of the respective stages. As noted above, the development of a control apparatus to achieve such simultaneous tuning has been hindered by the need in the apparatus devised for critical adjustments and the allowances, due to close tolerances, which must be made in the apparatus to tune the piece of equipment, such as a radio receiver.

It is an object of this invention to obtain an improved apparatus for automatically and accurately positioning a drive shaft.

It is another object of this invention to obtain a novel form of automatic tuning control for radio equipment that is accurate and simple in operation.

It is a further object of this invention to obtain a novel form of automatic tuning control including a Geneva wheel mechanism for accurately positioning a drive shaft to which tunable devices are mechanically connected.

It is a still further object of this invention to obtain a shaft positioning apparatus including a Geneva wheel mechanism which may be used in a control system to accurately and automatically tune a multiple number of tunable devices in response to the operation of a single selective control means.

The above objects are accomplished by mechanically connecting a drive shaft to a tunable component or device. A star wheel is fixedly mounted on the shaft in such a manner that the star wheel will move the shaft in accordance with the direction of movement imparted to the wheel by a driving means. A hunting switch including a plurality of electrical contacts is also mounted on the drive shaft so as to be moved in accordance with the direction of movement imparted to the drive shaft by the star wheel. The driving means which serves to operate the star wheel includes a solenoid relay and a gear mechanically connected to the star wheel. The solenoid relay operates a single normally open electrical switch, one contact of the switch being mechanically connected to a driving pin so as to drive the pin in a reciprocating fashion. An aperture is positioned in the gear adjacent to the outside edge thereof and is of sufficient size to receive the driving pin. The gear is also mechanically connected to a motor which is driven from a suitable source of energy. The hunting switch, which is mounted on the drive shaft, is electrically connected to the solenoid relay and to a selector control which has a plurality of electrical positions representing conditions or channels to which the tunable device may be tuned.

Upon the operation of the selector control, the solenoid relay will operate causing the driving pin to pass into and through the aperture in the gear. The operation of the solenoid also completes an electrical circuit between a suitable source of energy and the motor, thereby operating the motor. The motor will drive the gear causing the driving pin, which upon the operation of the solenoid relay extends through and beyond the surface of the gear, to engage one of the legs of the star wheel. The star wheel will be driven by the driving pin through a cycle of operation until the hunting switch which is driven in conjunction with the star wheel by the drive shaft has reached a desired position corresponding to the setting of the selector control. At the moment the hunting switch has reached the desired position, the solenoid relay is deactivated and the motor is disconnected from the source of energy. The apparatus will remain in an inoperative condition, maintaining the hunting switch at the desired position. As the hunting switch is caused to move in accordance with the direction of movement imparted to it by the drive shaft, the drive shaft to which the star wheel and the hunting switch are connected will also move through a cycle of operation tuning the component or device connected to the shaft. When the hunting switch has reached a desired position and the apparatus is rendered inoperative, the drive shaft will also have completed a certain cycle of operation. It may be seen that the tunable component or device will have been tuned in accordance with the operation of the drive shaft and the hunting switch.

The simultaneous tuning of a multiple number of components or devices may be accomplished by merely electrically connecting a number of the shaft positioning apparatus of the invention to a single selector control. Each of the positioning apparatus will be mechanically connected to one of the tunable components, the tuning of which is to be controlled by the apparatus. The sequence of operation is such that the selection of a particular position on the selector control will cause all of the positioning apparatus to operate simultaneously, automatically and immediately tuning all of the components to a condition or frequency as desired.

A more detailed description of the invention follows with reference to the accompanying drawing in which like parts are given like reference numerals, and in which:

Figure 9 is a view taken along line 9—9 of Figure 8.

Referring to Figures 1 through 4, a tuner 6, which may be a variable condenser or a slug-tuned coil or other tunable device, is connected to a pre-set mechanical coupling 8 by a drive shaft 7. The pre-set mechanical coupling 8 serves to transform mechanical motion imparted to it into the proper motion to tune the tuner 6 through a predetermined sequence of operation. A drive shaft 9 is connected to and provides mechanical motion for the operation of the coupling 8.

Figures 1, 2, 3, 4, 5:
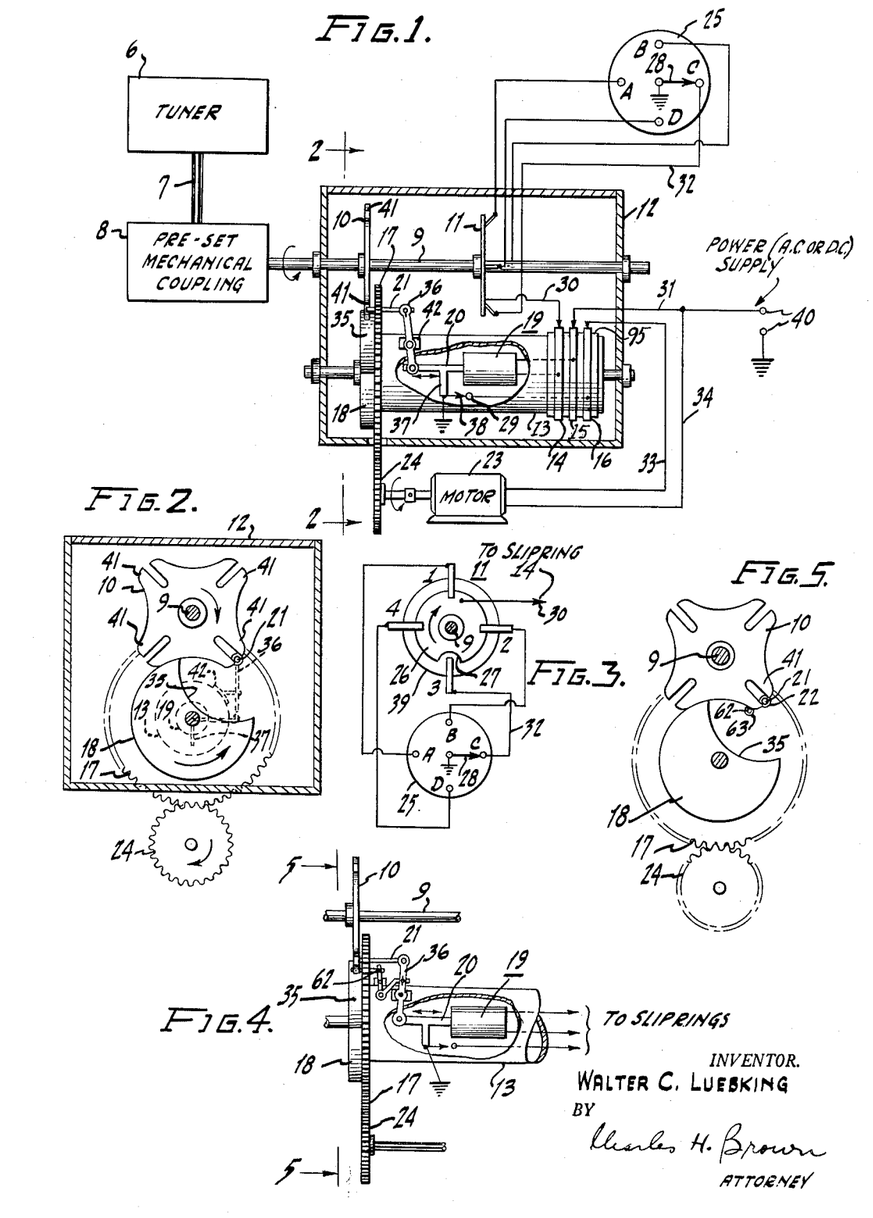
Figure 1 discloses a shaft positioning apparatus constructed in accordance with the invention.
Figure 2 is a view taken along line 2—2 of Figure 1.
Figure 3 is a circuit diagram of the selector control and hunting switch included in the positioning apparatus of Figure 1.
Figure 4 is a modification of the positioning apparatus of Figure 1 including a locking pin for controlling the movement of the star wheel.
Figure 5 is a view taken along line 5—5 of Figure 4.

The parts cooperating to effect the automatic positioning of the drive shaft 9 are arranged in a self-contained unit 12. The drive shaft 9 extends into and is loosely supported by the unit 12 so that it may be rotatably driven through a cycle of operation. A star wheel 10 having four slotted legs or points 41 and a hunting switch 11 are secured to the drive shaft 9 within the unit 12. A cylinder 13 is also loosely mounted within the unit 12 and is supported at its ends so that it may be rotatably driven through a cycle of operation. Slip rings 14, 15 and 16 are mounted at one end of the cylinder 13. The slip rings 14, 15 and 16 are each insulated from the cylinder 13 and from each other by a layer of insulating material 95 located between the outer surface of the cylinder 13 and the slip rings 14, 15 and 16. A gear 17 is mounted at the opposite end of the cylinder 13 and serves to drive the cylinder in accordance with a mechanical motion imparted to it by a second gear 24 which is connected to and driven by a motor 23. The mechanical connection between the two gears 17 and 24 is shown as a direct tooth drive type of operation, but it is to be understood that other types of operation may be used. A drum 18 is mounted on the outside surface of the gear 17, a section 35 of the drum being removed to provide an opening for the operation of the star wheel 10, as will be more fully described below.

A solenoid relay 19 is securely mounted within the cylinder 13, the solenoid serving to operate an arm 20. The free end of the arm 20 is connected to one end of a mechanical arm 36 which is pivotally movable about a support 42 mounted on the outside surface of the cylinder 13. The other end of the arm 36 is connected to a driving pin 21 which is positioned adjacent to an aperture 22 in the surface of the gear 17. Open section 35 of drum 18 is positioned adjacent to the aperture 22. The star wheel 10 and cylinder 13 are mounted within the unit 12 so that the edge surface of the wheel 10 will slideably engage the edge surface of the drum 18. Arm 20 includes a projection 37, the free end of which acts as one contact 38 of a single electrical switch operated by the solenoid relay 19.

A selector control 25 may be remotely located in relation to the shaft positioning apparatus. A four position control has been shown for purposes of description. However, a switch having any number of positions may be utilized for a particular application of the apparatus. The control includes an arm 28 which may be moved manually or automatically between the switch positions, the arm being connected to a suitable ground. As shown in Figures 1 and 3, the four positions of the selector control 25 are electrically connected to the contacts of the hunting switch 11. Four such contacts are shown. However, the number of contacts on the hunting switch may be any number as determined by the particular application of the apparatus. The hunting switch 11 includes a disc 39 of non-conductive material which is rigidly mounted within the unit 12 by suitable means, not shown. The contacts 1 through 4 of the hunting switch are mounted on the disc 39. An annular member 26 of conductive material is positioned centrally of the disc 39 and is driven in a circular direction by the shaft 9. The member 26 is electrically insulated from the shaft 9. A portion of the member 26 is removed or cut out at 27 to provide an open circuit between member 26 and any contact adjacent the cut-out section 27. The contacts 1 through 4 of the hunting switch 11 are mounted so as to make electrical connection with member 26. As member 26 is rotated by shaft 9, the open section 27 will pass from one contact position of the switch 11 to another, providing an open switch at the particular contact position at which section 27 is located. The member 26 is electrically connected by lead 30 to slip ring 14 which is mounted on cylinder 13. The slip ring 14 is also electrically connected one side of solenoid 19, the opposite side being electrically connected to slip ring 15. An A. C. or D. C. signal from a suitable source of energy, not shown, is fed from terminals 40 to slip ring 15 by lead 31.

To operate the apparatus, an operator determines a condition or frequency to which he wishes to tune the tuner 6. The operator, thereafter, manually or automatically sets the arm 28 of the selector control 25 at the corresponding position on the control. It will be assumed that position C has been chosen, but is to be understood that the operation would be the same following the selection of any of the other available positions. A circuit is completed from ground on arm 28, through position C on the selector control 25, lead 32, contact 3 (assuming that open section 27 is not adjacent thereto) and conductive member 26 of the hunting switch 11, and slip ring 14 to one side of relay 19, the other side of which is connected to a source of energy through slip ring 15, lead 31 and terminals 40. Relay 19 will operate. Upon the operation of relay 19, the arm 20 will be pulled in toward the relay thus closing contacts 29 and 38, as shown in Figure 1. A circuit is completed from ground through contacts 38 and 29, slip ring 16 and lead 33 to one side of motor 23 which is also connected to the source of energy through lead 34 and terminals 40. Motor 23 will operate. The energization of motor 23 will drive gear 24 in a clockwise direction, gear 24, in turn, driving gear 17 in a counter-clockwise direction. Gear 17 will impart the movement to cylinder 13 such that the cylinder will rotate at a speed determined by that of the motor 23, gear 24 and the gear ratio.

When relay 19 is activated and arm 20 is pulled in, the movement of arm 20 causes arm 36 to move about its support 42, thereby operating the driving pin 21. Driving pin 21 is positioned so as to pass in and out of aperture 22 on the surface of gear 17. When arm 36 is moved by arm 20, the driving pin 21 will be forced through and beyond the outside surface of gear 17. As the gear 17 and cylinder 13 rotate, the driving pin will, of course, be rotated, describing a circle about the central axis of the cylinder 13. Star wheel 10 is mounted so that the edge surface of the wheel is slideably engaged with the edge surface of drum 18. As the pin 21 continues its rotation, it will engage one of the slotted legs 41 of the wheel. The continued rotation of the gear 17 and pin 21 will cause the wheel 10 to be driven in a clockwise direction, the leg 41 of the wheel 10 dropping down into section 35 in order to complete the angular rotation of the wheel. After the wheel 10 has travelled through a ninety degree angle, the pin 21 will become disengaged from leg 41 and will continue its circular motion until it engages the next leg of wheel 10, again turning the wheel through ninety degrees. As the wheel 10 is caused to rotate, it will operate the drive shaft 9. Shaft 9 will provide mechanical motion to coupling 8 which, in turn, will drive the tuner 6 by the use of shaft 7 from one position of the tuner to the next.

Shaft 9 will also rotate member 26 of hunting switch 11. As member 26 rotates beneath the contacts of the switch, a continuous path to ground will be maintained until the open section 27 is located opposite contact 3. At this moment, the path from the relay 19 to ground through selector control 25 will be broken and the relay will be inactivated. The inactivation of the relay will open contacts 29 and 30 removing ground from motor 23, shutting off the motor. The release of arm 20 by relay 19 will also cause the retraction of pin 21, freeing the pin from any engagement with the legs 41 of wheel 10. The shaft positioning apparatus assumes an inoperative condition and no further movement will be imparted to the star wheel. The selector control and hunting switch will appear as shown in Figure 3. The appearance of the relay and driving pin while in idle or in an inoperative condition may be seen by an examination of Figure 4.

By selecting a position on the selector control 25, the apparatus will be activated to rotate the shaft 9 until the open section 27 of the hunting switch 11 is located at the contact on the hunting switch corresponding to the selected position on the selector control. At the moment the open section reaches the contact, operation ceases and the shaft 9 will have been moved into the proper setting. The movement of the shaft 9 determines the movement of shaft 7. When the shaft 9 has been properly positioned by the operation of the hunting switch 11, as determined by the setting of the selector control 25, the tuner 6 will have been tuned to the desired condition by shaft 7.

The mechanical alignment of the hunting switch 11, star wheel 10, coupling 8 and tuner 6 will have to be made with some care. It is necessary that the operative relationship be such that, as the star wheel is rotated through an angle by pin 21, the shaft 9 be driven so as to move the open section 27 from one contact position on the hunting switch 11 to the next and the tuner 6 from one tuned position to the next. The proper alignment is not difficult to make. Once the proper adjustments are made, the apparatus will remain accurate and dependable in operation, particularly since the adjustments are not critical in nature and are not subject to excessive wear by the continued operation of the apparatus.

Figure 6:
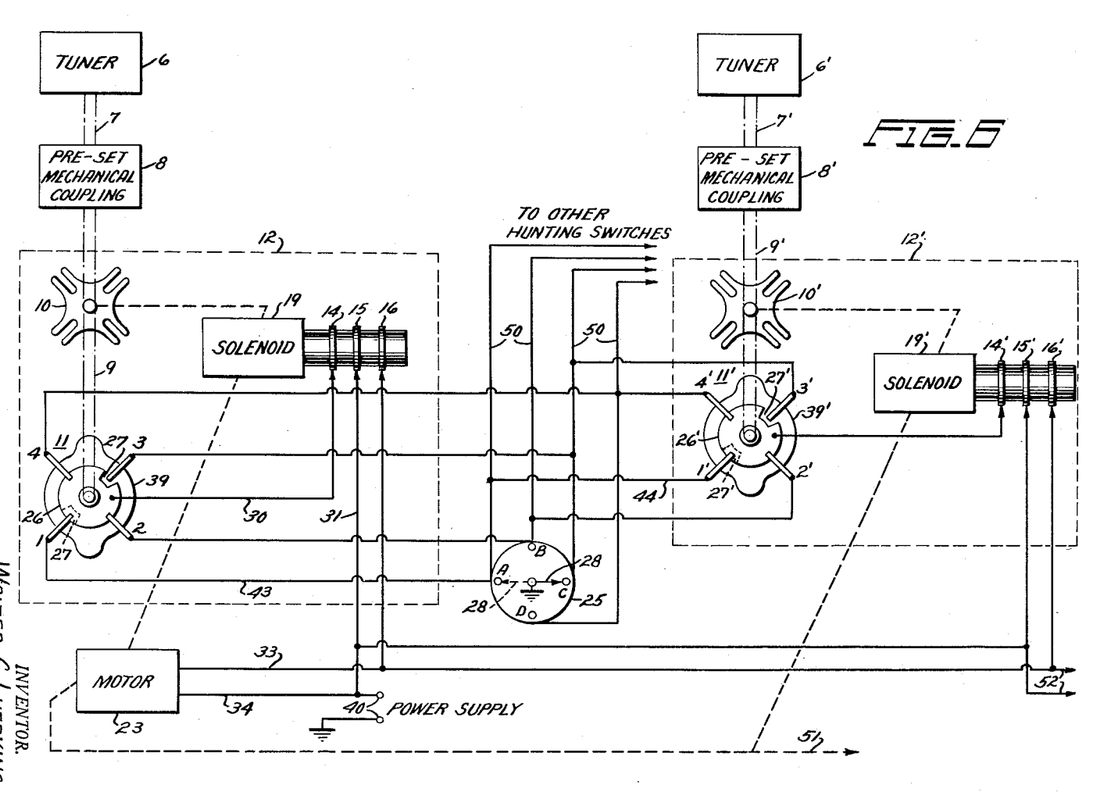
Figure 6 is a circuit diagram of a system including the positioning apparatus of the invention for automatically tuning a pair of components by means of a single selector control.

The description of the invention has been directed up to this point to the operation of a shaft positioning apparatus to control the tuning of a single component or device. An advantage of the apparatus is that it may readily be adapted for use with a multiple number of tunable components or devices. Referring to Figure 6, there is shown schematically a shaft positioning apparatus 12 and a second shaft positioning apparatus 12'. For ease of description, the same reference numerals have been used on the second unit as on the first, the reference numerals on the second unit being primed. The operation and construction of each unit is the same as that described in connection with Figure 1. The distinction is that when selector switch 25 is set to a particular position, the motor 23 will drive a plurality of positioning apparatus rather than just one.

Each tuner to be controlled has associated therewith a single shaft positioning unit. The contacts of the hunting switch in each of the units are electrically connected to the positions A to D of the control 25. Contact 1 of the hunting switch 11 of unit 12 is connected to position A of the control via lead 43, as is contact 1' of hunting switch 11' of unit 12' via lead 44. The remaining contacts of the hunting switches will be connected in a similar manner. The operation of unit 12' will be the same as that of unit 12 explained in connection with Figure 1. For example, it may be assumed that the selector control 25 had been set to operate the tuners 6 and 6' at position A, as shown by the dotted line 28 of Figure 6. The operation of the units 12 and 12' would be such that the open sections 27 and 27' of the members 26 and 26', respectively, would be adjacent to contacts 1 and 1' of the hunting switches as shown by the dotted lines on members 26 and 26' of the respective switches. Tuners 6 and 6' would be tuned to the condition corresponding to position A of the control 25. An operator may, thereafter, wish to re-tune the tuners 6 and 6' to the condition corresponding to position C of the control. Control arm 28 would be moved to position C. A ground connection would be completed through the hunting switches 11 and 11' to the solenoid relays 19 and 19' of units 12 and 12', respectively. Both relays will operate activating motor 23 which will drive the shafts 9 and 9' through the respective units 12 and 12' so as to tune the tuners 6 and 6' to the condition corresponding to position C on the control 25. Members 26 and 26' of the two hunting switches will have been rotated until the open sections 27 and 27' are positioned adjacent to the contacts 3 and 3' of the respective hunting switches, as shown in Figure 6. The operation of both units will occur simultaneously and the tuners 6 and 6' which may be included in a single piece of radio equipment will be tuned to a desired condition.

While only two shaft positioning apparatus have been shown, it is evident that any number may be used. Any number of tuners could be controlled from the single selector control by merely connecting the contacts of the hunting switches of the associated positioning apparatus to the positions of the selector control 25 by leads 50. All of the positioning units may be driven from a single motor 23, as shown in Figure 6. Connecting leads 52 would connect each of the units in series with the power input to the motor, a mechanical connection 51 serving to drive each of the units in the manner described. A separate motor could be used to drive each of the units in a particular application. In such a case, it would be necessary to merely connect the contacts of the hunting switches of each of the units to the selector control.

Figure 7:
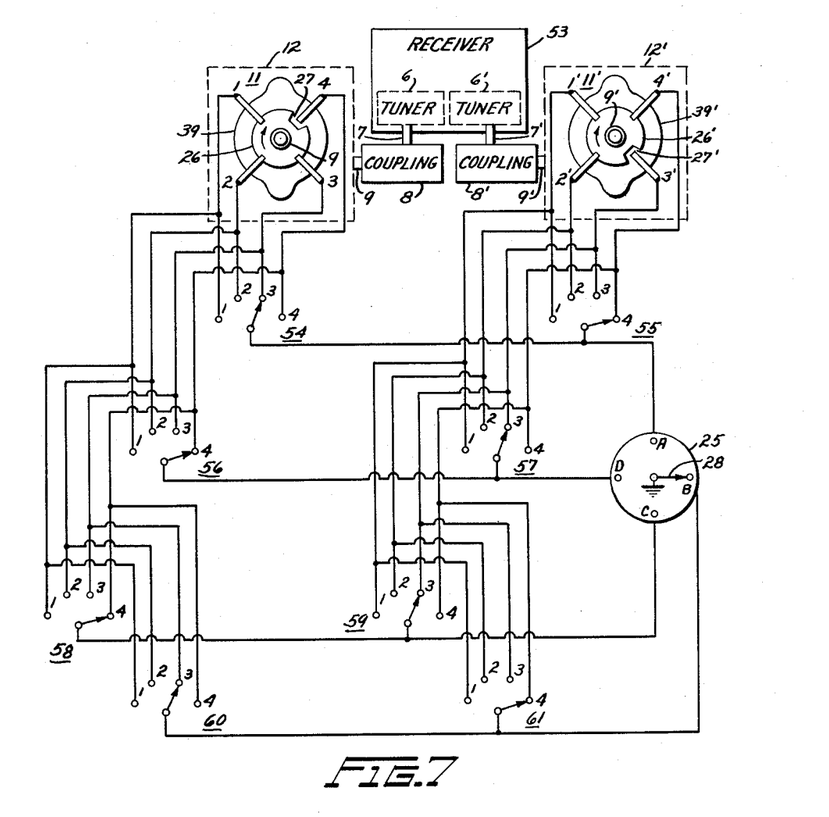
Figure 7 is a circuit diagram disclosing a switching system for the multiple control of a pair of hunting switches included in shaft positioning apparatus of the invention by a single selector control, Figure 8 discloses an automatic tuning control system including shaft positioning apparatus of the invention.

The operation of the shaft positioning units, as shown in Figure 6, may be controlled by the selector control in various ways to bring about a desired manner of operation. Figure 7 discloses a circuit for increasing the range of operation of the tuners. The tuners 6 and 6' are included in a radio receiver 53, as tunable stages thereof. In order to increase the range of operation of each of the tuners, an additional selector switch is connected between the hunting switch of each positioning unit and each position of the selector control. An operator, therefore, not only has the selection of the position to which he may tune the tuners, but he may also select the particular condition to which he wishes to tune the tuners at each of the positions of the selector control. For example, position B of selector control 25 is connected through switch 60 to hunting switch 11 and is also connected through switch 61 to hunting switch 11'. By pre-setting the switches 60 and 61, upon the positioning of the arm 28 of control 25 at position B, hunting switch 11 will be operated to position the open section 27 adjacent to contact 4 of the hunting switch. Hunting switch 11' will be operated to position the open section 27' adjacent to contact 3' of the hunting switch. Tuner 6 will be driven to a condition corresponding to contact 4 of the hunting switch 11 and tuner 6' will be driven to a condition corresponding to contact 3' of hunting switch 11'. The various combinations possible by the manipulation of the selector switches 60 and 61 will become evident by an examination of Figure 7. In the same manner, the operation of the tuners at position A of the selector control 25 will be determined by the setting of the switches 54 and 55, at position C by switches 58 and 59, and at position D by switches 56 and 57. Radio receiver 53 of which the tuners 6 and 6' are a part may be tuned to operate at any condition desired at each position of the selector control 25 by determining the proper setting of the switches associated with each position. By the inclusion of the switches 54 through 61 in the circuit, in association with the four position selector control 25, a large range of operation is possible. The additional switches 54 through 61 provide a number of combinations of conditions to which the tuners may be tuned, thereby greatly increasing the range of operation and selectivity of the receiver.

As shown in Figure 2, the success of the invention is based on the fact that there is no movement of the star wheel 10 so long as the driving pin 21 is held back from engagement with the legs 41 of the wheel by the action of the solenoid 19. This is true because the star wheel is riding along the edge surface of the drum 18 and cannot move or rotate until the open section 35 of the drum 18 is opposite one of the legs of the star wheel. In various embodiments of the invention, however, following the electrical inactivation of the shaft positioning apparatus, mechanical movement will be imparted to the drum 18 through gear 17 by the motor 23. This is particularly true in connection with embodiments such as are disclosed in Figures 6 and 7, wherein a single motor drives a plurality of positioning apparatus.

As shown in Figure 6, motor 23 will continue to operate and to drive the units 12 and 12' until the hunting switches in both units have found an open contact. Constructional differences between the units or the wiring of the control means for the units will, however, cause the hunting switches to reach the open condition at various times. The motor must continue to operate until all have reached the open condition. For example, in Figure 7, arm 28 may be moved from position B to C of the selector control 25. Assuming that members 26 and 26' of the hunting switches are being driven in a clockwise direction, unit 12 must be driven by the motor 23 until the open section 27 reaches contact 3, as determined by the setting of switch 58. The drive shaft 9 and member 26 will be driven through an angle of ninety degrees in order to move the open section 27 from contact 4 to contact 3. However, unit 12' must be driven by the motor 23 until the open section 27' reaches contact 4' as determined by the setting of switch 59. The drive shaft 9' and member 26' will be driven through an angle of 270 degrees. It is evident, therefore, that unit 12 will complete its tuning operation before unit 12'. Even though unit 12 is no longer driving its star wheel due to the electrical inactivation of the solenoid relay 19 and retraction of the driving pin 21 by the relay, motor 23 will continue to rotate the drum 18 of unit 12 through the driving gears 24 and 17 thereof until an open contact condition exists at hunting switch 11' in unit 12'.

As shown in Figure 2, as the drum 18 is caused to continue its rotation, the edge surface of wheel 10 will for a period of time be positioned opposite the open section 35. The driving pin 21 having been retracted through aperture 22 in gear 17, the wheel will be supported only by the edge surface of the drum 18. It is evident that the legs 41 of the wheel 10 may drop into the open section 35 as the section reaches a position opposite the wheel 10 during the continued operation of drum 18 through gears 17 and motor driven gear 24. Such an accident must be prevented in that the continued operation of the unit 12 may be disrupted and in that the movement of the wheel 10 will affect a re-positioning of the drive shaft 9 which will re-tune the tunable device 6 to which drive shaft 9 is connected, as shown in Figure 1.

Various means for maintaining star wheel 10 in a locked position will become apparent to those skilled in the art. Wheel 10 and drum 18 could be made of a magnetic material, such that the edge surfaces of the components, while slideably engaged, would be strongly attracted to one another holding the wheel 10 in a locked position. A further means for locking the wheel 10 from rotation is shown in Figures 4 and 5. A locking pin 62 is mounted on the cylinder 13 and mechanically connected to arm 36. The locking pin 62 is positioned so as to pass through an aperture 63 in the surface of the gear 17 located adjacent to section 35. The mechanical connection of the pin 62 to the arm 36 is made in such a manner that the locking pin 62 will move in a direction opposite to that of the driving pin 21. When the driving pin 21 is pulled back by the inactivation of solenoid 19, locking pin 62 will be pushed forward through aperture 63. Upon the activation of solenoid 19, driving pin 21 will be extended through aperture 22 and the locking pin 62 will be retracted. As shown in Figure 5, the locking pin 62 is positioned so that in the extended condition it will act as a support for the wheel 10 when the open section 35 is positioned adjacent to the wheel. During idle periods when the unit 12 is electrically deactivated, locking pin 62 will extend outwardly from the surface of gear 17 so as to support the edge surface of wheel 10 and act as a lock preventing the wheel from extraneous movement due to the continued rotation of the drum 18. By utilizing such a locking device, a number of shaft positioning units of the invention may be driven from a single motor without deleteriously affecting the proper operation of the individual units.

Figures 8, 9:
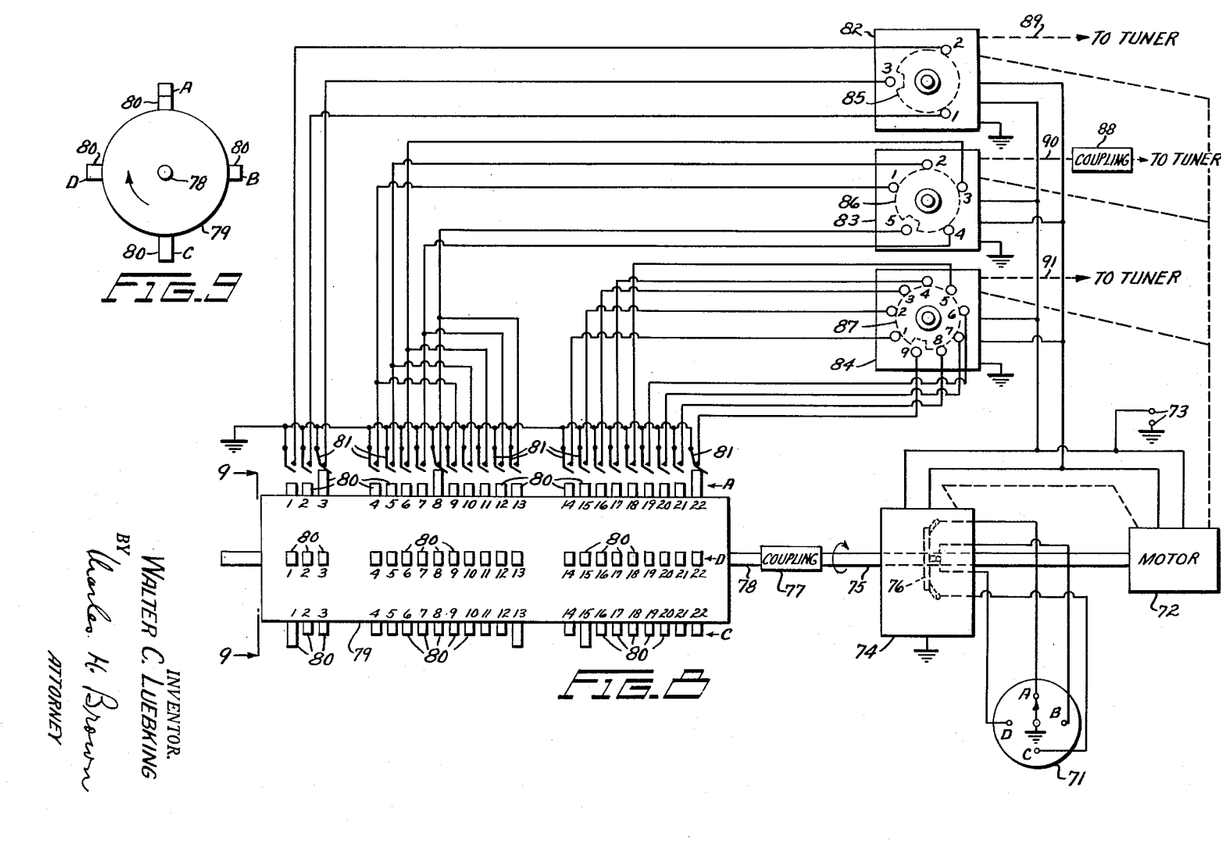

A further application of the invention in a tuning control system is shown in Figures 8 and 9. A four position selector control 71 is connected to the contacts of a hunting switch 76 included in a shaft positioning apparatus 74 constructed according to this invention. The apparatus 74 is connected to terminals 73 to which is connected a suitable source of energy, not shown, and is mechanically driven by a motor 72. The positioner 74 drives a shaft 75 in the manner described in connection with Figure 1. The hunting switch 76 will seek an open condition corresponding to the position A, B, C or D at which the control 71 is set. Drive shaft 75 is mechanically connected through a suitable coupling 77 to a second shaft 78. Shaft 78 will rotate a drum 79 in accordance with the motion imparted to the shaft 78 by shaft 75 through coupling 77. As shown in Figure 9, it will be assumed that the drum 79 is driven in a clockwise direction. A drum 79 of the type shown in Figure 8 is known in the art as a memory drum. A multiple number of pins 80 which are made of a non-conductive material are arranged on the surface of the drum 79 in four parallel rows along the longitudinal axis of the drum. Each row corresponds to one of the positions A through D of the selector control 71. The top row is shown as row A, the bottom row as row C, and the middle row as row D, row C not being visible in the view given in Figure 8. While only four positions have been shown on selector control 71, any desired number could be used. The number of rows of pins 80 on the drum 79 will be varied according to the number of positions that are utilized on the control 71. Generally, for each additional position on the control 71, an additional row of pins 80 will be mounted on the drum 79. However, the actual number of rows of pins 80, as compared with the number of positions on the control 71, may be varied by the use of suitable coupling means in accordance with the use to which the arrangement is to be put.

The pins 80 are mounted on the drum in a reciprocating fashion such that each pin may independently be pulled out to an extended position from that of the other pins. The pins 80 may be secured to the drum 79 in a slideable manner or in anyway which will permit them to be moved toward or away from the surface of the drum. As the drum 79 is caused to rotate by the motion imparted to shaft 75 by the positioning apparatus 74, each row of pins will sequentially move beneath a single row of contact switches 81. The switches 81 are positioned along the longitudinal axis of the drum 79 such that, as a row of pins is located adjacent the row of switches, one of the switches will be adjacent to each one of the pins in the row.

In the embodiment shown in Figure 8, each row of pins A through D includes twenty-two pins 80. Twenty-two switches 81, one contact of each switch being connected to a suitable ground, are arranged along the longitudinal axis of the drum 79 adjacent the pins. The first three switches 81 are connected to a three contact hunting switch 85 of shaft positioning apparatus 82. Apparatus 82 is connected to a source of energy through terminals 73 and is mechanically driven by motor 72. As explained in connection with Figure 1, the apparatus 82 will drive a tuner through a mechanical connection 89.

The following ten switches 81 or the fourth through thirteenth of the twenty-two switches are connected to a five contact hunting switch 86 of shaft positioning apparatus 83. Apparatus 83 derives electrical energy from a suitable source through terminals 73 and is also mechanically driven by motor 72. Each contact of the hunting switch 86 is connected to two of the switches 81. For example, the fourth and ninth switches are connected to contact one of hunting switch 86, the fifth and tenth switches connected to contact two and so forth. A two-to-one ratio is, therefore, established between the switches and the contacts of the hunting switch 86. The apparatus 83 drives a tuner by mechanical connection 90 through a coupling 88. The tuner will be driven in a two-to-one ratio by the coupling 88 so that a complete tuning cycle of the tuner will require two rotations of the hunting switch 86. By connecting the second five switches 81 in parallel with the first five, it may be seen that the hunting switch 86 will act in effect as a ten contact hunting switch. The apparatus 83 drives the tuner by means of coupling 88 through ten tuning positions corresponding to the ten switches 81.

The remaining nine switches 81 are connected to a nine contact hunting switch 87 of shaft positioning apparatus 84. As in the case of the other positioning apparatus 82 and 83, apparatus 84 is connected to a source of energy through terminals 73 and is mechanically driven by motor 72. The apparatus 84 drives a tuner through mechanical connection 91.

The operation of the arrangement is similar to that of the arrangement shown in Figure 7. Instead of using selector switches 54 through 61, a drum 79 and pins 80 are utilized to control the positioning of the hunting switches of each of the shaft positioning apparatus and, therefore, the tuning of the tuners driven thereby. One of the four positions or channels of operation A through D may be chosen by setting selector control 71. It will be assumed that position A has been so selected, but the operation of the arrangement at the other positions will be exactly the same. Shaft positioning apparatus 74 will seek an open condition at the contact of hunting switch 76 corresponding to position A of selector control 71. Drive shaft 75 will be rotated so as to drive drum 79 until row A of pins 80 is located adjacent to the row of switches 81.

The control of shaft positioning apparatus 82, 83 and 84 is determined by pulling out a combination of pins in each row of the pins 80 on the surface of drum 79 corresponding to the setting of the tuners desired. For example, at row A apparatus 82 is set to tune a tuner to a condition corresponding to contact three of hunting switch 85 by extending pin 3 of row A. Apparatus 83 will tune a tuner to a condition corresponding to contact five of hunting switch 86 by extending pin 8 of row A. In the same manner, apparatus 84 will tune a tuner to a condition corresponding to contact nine of hunting switch 87 by extending pin 22 of row A.

As shaft positioning apparatus 74 rotates the drum 79 so as to locate row A of pins 80 adjacent the row of switches 81, pins 3, 8 and 22 will close the contacts of the switches adjacent thereto. While a simple lever control is shown, any suitable type of control, many of which are known in the art, may be used. Immediately upon the closing of the switches, apparatus 82 will seek an open condition at contact 3, apparatus 83 at contact 5 and apparatus 84 at contact 9 of the respective hunting switches 85, 86, and 87. The tuners will be tuned to a condition corresponding to the setting of the hunting switch as determined by the setting of the pins 80 of row A of drum 79. By pre-setting the pins 80 of each row A through D, the tuners are driven by the associated shaft positioning apparatus 82, 83 and 84 such that they will be tuned to a desired condition at each position of the selector control 71.

The tuners may be used in separate equipment, for example, a transmitter, receiver and a master control unit, or they may be incorporated in a single unit such as a radio receiver. By utilizing the tuners in a single receiver to tune various stages of the receiver, the use of the arrangement shown will permit the automatic tuning of the receiver to a frequency or condition desired, the simultaneous control of the various stages permitting the rapid and accurate tuning of the receiver, as is most desirable in communication systems.

It is readily apparent that an arrangement of the type shown may be used to control any number of tuners. The arrangement can be adapted by varying the number of shaft positioning apparatus, selector control positions, rows of pins and the pins in each row for use in any particular application. Many such combinations of the components of the arrangement will be evident to those reasonably skilled in the art. By utilizing the shaft positioning apparatus of the invention, an automatic tuning control system is obtained which is simple in construction and extremely accurate in operation due to the employment of a Geneva wheel mechanism in the apparatus as a driving means.

Having described my invention, I claim:

1. In an apparatus for automatically positioning a shaft, a Geneva movement for rotating said shaft step by step, said movement including a slotted disc mounted on said shaft, a stop device movably mounted on said shaft, a solenoid relay, a member movable in response to energization of said relay to engage said disc, a motor, coupling means interconnecting said motor and said member for imparting movement to said member in accordance with the motion imparted to said means by said motor, and control means including said stop device for energizing said relay and said motor thereby to operate said disc by said movable member through an angle of rotation.

2. In an apparatus for automatically positioning a shaft, a Geneva movement for rotating said shaft step by step comprising, in combination, a star wheel mounted on said shaft, a stop device movably mounted on said shaft, a solenoid relay, a movable member having a driving pin connected to and operated in conjunction with said member, said member movable in response to energization of said relay to cause said driving pin to engage said star wheel, a motor, coupling means interconnecting said motor and said driving pin for imparting movement to said driving pin in accordance with the motion imparted to said means by said motor, and control means including said stop device for energizing said relay and said motor thereby to drive said star wheel by said driving pin through an angle of rotation.

3. In an apparatus for automatically positioning a shaft, a Geneva movement for rotating said shaft step by step comprising, in combination, a star wheel mounted on said shaft, a stop device movably mounted on said shaft, a solenoid relay including a core member having a driving pin connected to one end of and operated in conjunction with said member, said member movable in response to energization of said relay to cause said driving pin to engage said star wheel, a motor, coupling means interconnecting said motor and said driving pin for imparting movement to said driving pin in accordance with the motion imparted to said means by said motor, a selector control switch, control means including said selector control switch for controlling the operation of said stop device thereby to energize said relay and said motor to drive said star wheel by said driving pin through an angle of rotation.

4. An apparatus for automatically positioning a shaft comprising, in combination, a star wheel mounted on said shaft for rotating said shaft step by step, a hunting switch, said switch including a stop device movably mounted on said shaft, a solenoid relay, a movable member having a driving pin connected to one end of and operated in conjunction with said member, said member movable in response to energization of said relay to cause said driving pin to engage said star wheel, a motor, coupling means mechanically interconnecting said motor and said pin for imparting movement to said pin in accordance with that imparted to said means by said motor, and control means including said stop device for energizing said relay and said motor thereby to drive said star wheel by said driving pin through an angle of rotation.

5. An apparatus for automatically positioning a shaft comprising, in combination, a star wheel mounted on said shaft for rotating said shaft step by step, a hunting switch, said switch including a stop device movably mounted on said shaft, a solenoid relay including a core member having a driving pin mechanically connected to one end of and operated in conjunction with said member, said member movable in response to the energization of said relay to cause said driving pin to engage said star wheel, a motor, means including said motor for circularly rotating said relay and said pin, and control means including said stop device for energizing said relay and said motor thereby to drive said star wheel by said driving pin through an angle of rotation.

6. An apparatus for automatically positioning a shaft comprising, in combination, a star wheel mounted on said shaft for rotating said shaft step by step, a stop device movably mounted on said shaft, a solenoid relay, a movable member having a driving pin and a locking pin connected to one end of and operated in conjunction with said member, said member movable in response to the energization of said relay to cause said driving pin to engage said star wheel, a motor, coupling means mechanically interconnecting said motor and said pins to impart movement thereto in accordance with the motion imparted to said means by said motor, control means including said stop device for energizing said relay and said motor thereby to drive said star wheel by said driving pin through an angle of rotation, said locking pin being connected to and operated by said movable member to engage said wheel and to prevent uncontrolled movement thereof during periods of inactivation of said relay.

7. An apparatus for automatically positioning a shaft comprising, in combination, a star wheel mounted on said shaft for rotating said shaft step by step, a hunting switch, said switch including a stop device movably mounted on said shaft, a solenoid relay including a core member having a driving pin and a locking pin connected to one end of and operated in conjunction with said core member, said member movable in response to the energization of said relay to cause said driving pin to engage said star wheel, a motor, coupling means mechanically interconnecting said motor and said pins for imparting movement to said pins in accordance with the motion imparted to said means by said motor, a selector control switch, means including said selector control switch for controlling the operation of said stop device to energize said relay and said motor thereby driving said wheel by said driving pin through an angle of rotation, said locking pin being connected to and operated by said member to engage said wheel and to prevent uncontrolled movement thereof during periods of inactivation of said relay.

8. An automatic tuning control system including a tunable device comprising, in combination, a drive shaft operatively connected to said device, a star wheel mounted on said shaft for rotating said shaft step by step, a stop device movably mounted on said shaft, a solenoid relay, a movable member having a driving pin connected to one end of and operated in conjunction with said member, said member movable in response to the energization of said relay to cause said driving pin to engage said star wheel, a motor, coupling means mechanically interconnecting said motor and said pin for imparting movement to said pin in accordance with the motion imparted to said means by said motor, and control means including said stop device for energizing said relay and said motor thereby to drive said star wheel by said driving pin through an angle of rotation.

9. An automatic tuning control system including a tunable device comprising, in combination, a drive shaft operatively connected to said device, a star wheel mounted on said shaft for rotating said shaft step by step, a hunting switch, said switch including a stop device movably mounted on said shaft, a solenoid relay including a core member having a driving pin connected to one end of and operated in conjunction with said member, said member being movable in response to the energization of said relay to cause said driving pin to engage said star wheel, a motor, means including said motor for circularly rotating said pin, and control means including said stop device for energizing said relay and said motor thereby to drive said star wheel by said driving pin through an angle of rotation.

10. An automatic tuning control system including a tunable device comprising, in combination, a drive shaft operatively coupled to said device, a star wheel rotatably mounted on said shaft for rotating said shaft step by step, a stop device movably mounted on said shaft, a solenoid relay, a movable member having a driving pin and a locking pin connected to one end of and operated in conjunction with said member, said member being movable in response to the energization of said relay to cause said driving pin to engage said star wheel, a motor, coupling means mechanically interconnecting said motor and said member for imparting movement thereto in accordance with the motion imparted to said means by said motor, control means including said stop device for energizing said relay and said motor thereby to drive said wheel by said driving pin through an angle of rotation, said locking pin connected to and operated by said member to engage said wheel and prevent uncontrolled movement thereof during periods of inactivation of said relay.

11. An automatic tuning control system including a tunable device comprising, in combination, a drive shaft operatively coupled to said device, a star wheel mounted on said shaft for rotating said shaft step by step, a hunting switch, said hunting switch including a stop device movably mounted on said shaft, a solenoid relay including a core member having a driving pin and a locking pin connected to one end of and operated in conjunction with said core member, said member being movable in response to the energization of said relay to cause said driving pin to engage said star wheel, a motor, means including said motor for circularly rotating said relay and said member, control means including said stop device for energizing said relay and said motor thereby to drive said wheel by said driving pin through an angle of rotation, said locking pin connected to and operated by said member to engage said wheel preventing uncontrolled movement thereof during periods of inactivation of said relay.

12. An automatic tuning control system including a plurality of tunable devices, each of said devices operatively connected to one of a plurality of shaft positioning apparatus, each of said apparatus comprising, in combination, a drive shaft operatively connected to one of said devices, a star wheel mounted on said shaft for rotating said shaft step by step, a solenoid relay, a member movable in response to the energization of said relay to engage said star wheel, a motor, means including said motor for imparting movement to said member; said tuning control system including control means for energizing said relays of each of said positioning apparatus and said motor thereby to drive the star wheel of each of said apparatus by said respective members through an angle of rotation.

13. An automatic tuning control system including a plurality of tunable devices, each of said devices operatively connected to one of a plurality of shaft positioning apparatus, each of said apparatus comprising, in combination, a drive shaft operatively connected to one of said devices, a star wheel mounted on said shaft for rotating said shaft step by step, a solenoid relay, a movable member having a driving pin and a locking pin connected to and operated in conjunction with said member, said member being movable in response to the energization of said relay to cause said driving pin to engage said star wheel, a motor, means including said motor for imparting movement to said pins, control means for energizing said relay and said motor thereby to drive said star wheel by said driving pin through an angle of rotation, said locking pin connected to and operated by said member to engage said wheel preventing uncontrolled movement thereof during periods of inactivation of said relay.

14. An automatic tuning control system including a plurality of tunable devices, each of said devices operatively connected to one of a plurality of shaft positioning apparatus, each of said apparatus comprising, in combination, a drive shaft operatively connected to one of said devices, a hunting switch, said hunting switch including a stop device movably mounted on said shaft, a star wheel mounted on said shaft for rotating said shaft step by step, a solenoid relay including a movable core member having a driving pin connected to one end of and operated in conjunction with said member, said member movable in response to the energization of said relay to cause said driving pin to engage said star wheel, a motor drive means, means including said drive means for imparting movement to said pin; said tuning control system also including a single selector control switch, and means including said selector control switch and the hunting switches of each of said positioning apparatus for energizing said relays and said motor drive means thereby to drive the star wheel of each of said apparatus by said respective driving pins through an angle of rotation.

15. An automatic tuning control system including a plurality of tunable devices, each of said devices operatively connected to one of a plurality of shaft positioning apparatus, each of said apparatus comprising, in combination, a drive shaft operativiely connected to one of said devices, a hunting switch, said hunting switch including a stop device movably mounted on said shaft, a star wheel mounted on said shaft for rotating said shaft step by step, a solenoid relay, a movable member having a driving pin connected to one end of and operated in conjunction with said member, said member being movable in response to the energization of said relay to cause said driving pin to engage said star wheel, a motor drive means, means including said drive means for imparting movement to said pin; said tuning control system also including a single selector control switch for controlling the operation of said hunting switches of each of said positioning apparatus, said hunting switches being operated to energize said relays and said motor drive means to drive the star wheel of each of said apparatus by said respective driving pins through an angle of rotation.

References Cited in the file of this patent

UNITED STATES PATENTS

| | | |
|---|---|---|
| 2,409,895 | Phelps | Oct. 22, 1946 |
| 2,436,068 | Hegy | Feb. 17, 1948 |